US010693293B2

(12) United States Patent
Qi et al.

(10) Patent No.: US 10,693,293 B2
(45) Date of Patent: Jun. 23, 2020

(54) FAULT PROTECTION IN CONVERTER-BASED DC DISTRIBUTION SYSTEMS

(71) Applicant: ABB Schweiz AG, Baden (CH)

(72) Inventors: Li Qi, Cary, NC (US); Jiuping Pan, Raleigh, NC (US); Yao Chen, Beijing (CN); Guoju Zhang, Beijing (CN)

(73) Assignee: ABB Schweiz AG, Baden (CH)

( * ) Notice: Subject to any disclaimer, the term of this patent is extended or adjusted under 35 U.S.C. 154(b) by 119 days.

(21) Appl. No.: 15/344,013

(22) Filed: Nov. 4, 2016

(65) Prior Publication Data

US 2017/0054291 A1 Feb. 23, 2017

Related U.S. Application Data

(63) Continuation of application No. PCT/CN2014/076720, filed on May 4, 2014.

(51) Int. Cl.
H02J 1/00 (2006.01)
H02H 7/26 (2006.01)
(Continued)

(52) U.S. Cl.
CPC ............ H02J 1/00 (2013.01); H02H 3/025 (2013.01); H02H 3/06 (2013.01); H02H 7/268 (2013.01);
(Continued)

(58) Field of Classification Search
CPC ............ H02H 7/268; H02H 3/02; H02H 3/08; H02H 3/20; B63H 21/20; B63H 23/24;
(Continued)

(56) References Cited

U.S. PATENT DOCUMENTS

2012/0201059 A1 8/2012 Berggren et al.
2012/0300510 A1* 11/2012 Jensen ............... H02J 3/36
363/35
(Continued)

FOREIGN PATENT DOCUMENTS

CN 103457246 A 12/2013
EP 1914162 A1 4/2008
(Continued)

OTHER PUBLICATIONS

International Search Report, PCT/CN2014/076720, dated Jan. 6, 2015, 4 pages.
(Continued)

Primary Examiner — Rexford N Barnie
Assistant Examiner — Elim Ortiz
(74) Attorney, Agent, or Firm — Taft Stettinius & Hollister LLP; J. Bruce Schelkopf

(57) ABSTRACT

Methods and apparatus for protecting a direct-current (DC) electric power distribution system that includes one or more AC/DC converters and/or one more DC/DC converters, and one or more loads, connected by DC buses. An example method, which is carried out in response to the detection of a fault somewhere in the system, begins with limiting an output current of each of one or more of the converters so that each of the limited converters outputs a limited DC current at or about a corresponding predetermined current level. After the current limiting of the one or more converters has taken place, one or more protection devices in the system are activated, where the activating at least partly depends on the limited DC currents being at or about the predetermined fault current levels.

26 Claims, 12 Drawing Sheets

(51) Int. Cl.
  *H02M 1/32*   (2007.01)
  *H02H 3/02*   (2006.01)
  *H02H 3/06*   (2006.01)
  *H02H 9/02*   (2006.01)
  *H02M 3/04*   (2006.01)
  *H02M 7/04*   (2006.01)

(52) U.S. Cl.
  CPC ................ *H02H 9/02* (2013.01); *H02M 1/32* (2013.01); *H02M 3/04* (2013.01); *H02M 7/04* (2013.01)

(58) Field of Classification Search
  CPC .... H02J 1/14; H02J 3/1857; H02J 3/36; H02J 4/00
  See application file for complete search history.

(56) References Cited

U.S. PATENT DOCUMENTS

| | | |
|---|---|---|
| 2014/0002943 A1 | 1/2014 | Berggren et al. |
| 2014/0022680 A1* | 1/2014 | Berggren ................ H02H 3/02 361/79 |

FOREIGN PATENT DOCUMENTS

| | | |
|---|---|---|
| JP | 5449625 B1 | 3/2014 |
| WO | 2011012174 A1 | 2/2011 |
| WO | 2012123014 A2 | 9/2012 |
| WO | 2012143245 A1 | 10/2012 |
| WO | 2013174726 A1 | 11/2013 |
| WO | 2013/182231 A1 | 12/2013 |

OTHER PUBLICATIONS

Written Opinion of the International Searching Authority, PCT/CN2014/076720, dated Jan. 6, 2015, 5 pages.

Office Action as issued in corresponding China Application No. 201480080344.6 and English translation thereof.

* cited by examiner

FAULT PROTECTION IN CONVERTER-BASED DC DISTRIBUTION SYSTEMS

TECHNICAL FIELD

The present disclosure relates to direct-current (DC) electric power distribution systems, and in particular relates to techniques for managing faults in such systems.

BACKGROUND

Recent improvements in the power handling capabilities and energy densities for electronic switches have facilitated the development of direct-current (DC) power distribution systems. FIG. 1 is a schematic of an example DC distribution power system, where the DC distribution network is connected to a transmission system via appropriate power transformation and conversion interfaces. There are alternating-current (AC) generation, DC distributed generation (DG), energy storage (ES), and load subsystems connected to each bus by converters or lines. The various DC buses, identified in FIG. 1 as DC1, DC2, etc., are connected to one another by branches (overhead lines or cables) or converters.

Shown in FIG. 1 are a number of converters, including AC/DC converters 110 and DC/DC converters 120. For the purposes of the present disclosure, converters of either of these types may be referred to herein as simply DC converters, meaning that the converters have at least DC power interface. It will be appreciated that these converters may be uni-directional or bi-directional with respect to power flow, depending on their specific applications, and may be of any of several known designs.

As seen in FIG. 1, a group of equipment can be connected to any particular DC bus. Systems are typically designed so that power supply to any particular group of loads can be provided from one or several alternative DC buses, to meet reliability requirements for the system. The system includes several protective devices, such as DC switches 130. Typically at least one protective device is installed next to each DC bus to isolate faults on DC buses or downstream branches.

DC distribution systems like that shown in FIG. 1 and its variations may be used in DC distribution networks, DC industrial systems, DC renewable energy collection systems, DC shipboard power systems, DC data centers, DC building systems, etc. A DC distribution system may be coupled to one or more AC transmission systems and/or AC distribution systems.

Electric power utilities in the US and around the world are currently in the process of upgrading their AC distribution systems to simplify and automate system operation by implementing enhanced monitoring, distribution automation and control solutions. The ultimate goal from a distribution system operations standpoint, as stated by many utilities in their roadmaps to the so-called Smart Grid, is to achieve smart, self-healing grids. These grids should be capable of automatic isolation of permanent faults and automatic system reconfiguration, to quickly restore power to as many customers as possible by switching affected customers over to alternative sources of power in the event of an interruption.

This goal can be achieved within the distribution management system (DMS) framework by adding various smart sensors, integrating sensor and meter data into decision making process, and using advanced hybrid (wired/wireless) communications infrastructure, to implement automatic fault location, isolation and load restoration schemes.

Several problems arise when trying to apply these automatic fault isolation and recovery techniques to DC distribution systems. Due to small resistances and a lack of inductance in these systems, when a DC fault occurs, the rate of rise of DC fault current is quite fast, and the peak fault current is very high. Normally, DC fault current can reach its peak current in very short time. The fast rate of rise creates difficulties for fault isolation, and high DC fault current may damage equipment in the protected DC distribution system.

In a converter-based DC distribution system, large fault currents cannot be allowed for very long, due to operation limits of equipment or devices. For example, the maximum current that can be allowed to flow through power electronic switches is limited by its Safe Operating Area (SOA). FIG. 2 shows a typical SOA of a power electronic switch, as might be found in its device datasheet. Any operation within the boundaries indicated the by bold lines in the figure as 1) current boundary; 2) thermal boundary; 3) secondary breakdown boundary; 4) voltage boundary), is safe and allowed. All four boundaries, except for the secondary breakdown boundary, exist for all power electronic switches.

Improved techniques for fault isolation and recovery, specific to the problems that arise in DC distribution system, are needed.

SUMMARY

Embodiments of the presently disclosed techniques provide for system protection of converter-based DC distribution systems, through the use of various combinations of fault detection, fault current limiting, fault location, and fault isolation and reconfiguration.

Specific embodiments include several methods for protecting a direct-current (DC) electric power distribution system that includes one or more loads, one or more DC buses, and one or more converters, where the one or more converters include one or more AC/DC converters and/or one or more DC/DC converters. An example method, which is carried out in response to the detection of a fault somewhere in the system, begins with limiting an output current of each of one or more of the converters so that each of the limited converters outputs a limited DC current at or about a corresponding predetermined current level. After the current limiting of the one or more converters has taken place, one or more protection devices in the system are activated, where the activating at least partly depends on the limited DC currents being at or about the predetermined current levels.

In some embodiments, activating the one or more protection devices is a multi-step process that includes identifying a location for the detected fault, based on measurements of currents on the DC buses and opening one or more DC switches in the system, based on the identified location of the detected fault. The identifying of the location at least partly depends on the limited DC currents being at or about the predetermined current levels;

In other embodiments, activating the one or more protection devices includes the automatic opening of one or more protection devices, where the opening of each protection device is based on a respective device current exceeding at least one respective threshold for a respective period of time, and where the thresholds are based on the predetermined current levels.

Another example method for protecting a direct-current (DC) electric power distribution system that includes one or more loads, one or more DC buses, and one or more converters, where the one or more converters include one or more AC/DC converters and/or one or more DC/DC converters, may be implemented in one or more control units in or attached to the system. This example method includes: receiving measurements of DC bus currents; receiving an indication of a fault in the system; identifying a location for the indicated fault, based on the measurements of DC bus currents; and opening one or more DC switches in the system, based on the identified location of the indicated fault. Once again, the identifying of the fault location at least partly depends on a predetermined, limited, DC current level for at least one of the DC converters;

Other embodiments of the systems and techniques described herein include direct-current (DC) electric power distribution systems that comprise multiple DC buses, each either directly or through converters associated with one or more power sources and one or more loads, connected by branches and converters, wherein at least one of the converters is an AC/DC converter or DC/DC converter operable to produce a respective converter current at or about a predetermined, limited, DC current level in response to a detection of a fault or under the control of a controller. These systems further include one or more DC switches, wherein each DC switch is operative to disconnect at least a portion of a DC bus or a DC branch, and a controller circuit. The controller circuit is configured to receive measurements of DC bus currents, receive an indication of a fault in the system, identify a location for the indicated fault, based on the measurements of DC bus currents, and open one or more of the DC switches, based on the identified location of the indicated fault. The controller's identification of the fault location at least partly depends on the converter current being at or about its corresponding predetermined, limited, DC current level for at least one of the DC converters.

Those skilled in the art will recognize still further embodiments, as well as additional features and advantages of several of these embodiments, upon reading the following detailed description and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

Figure 1:
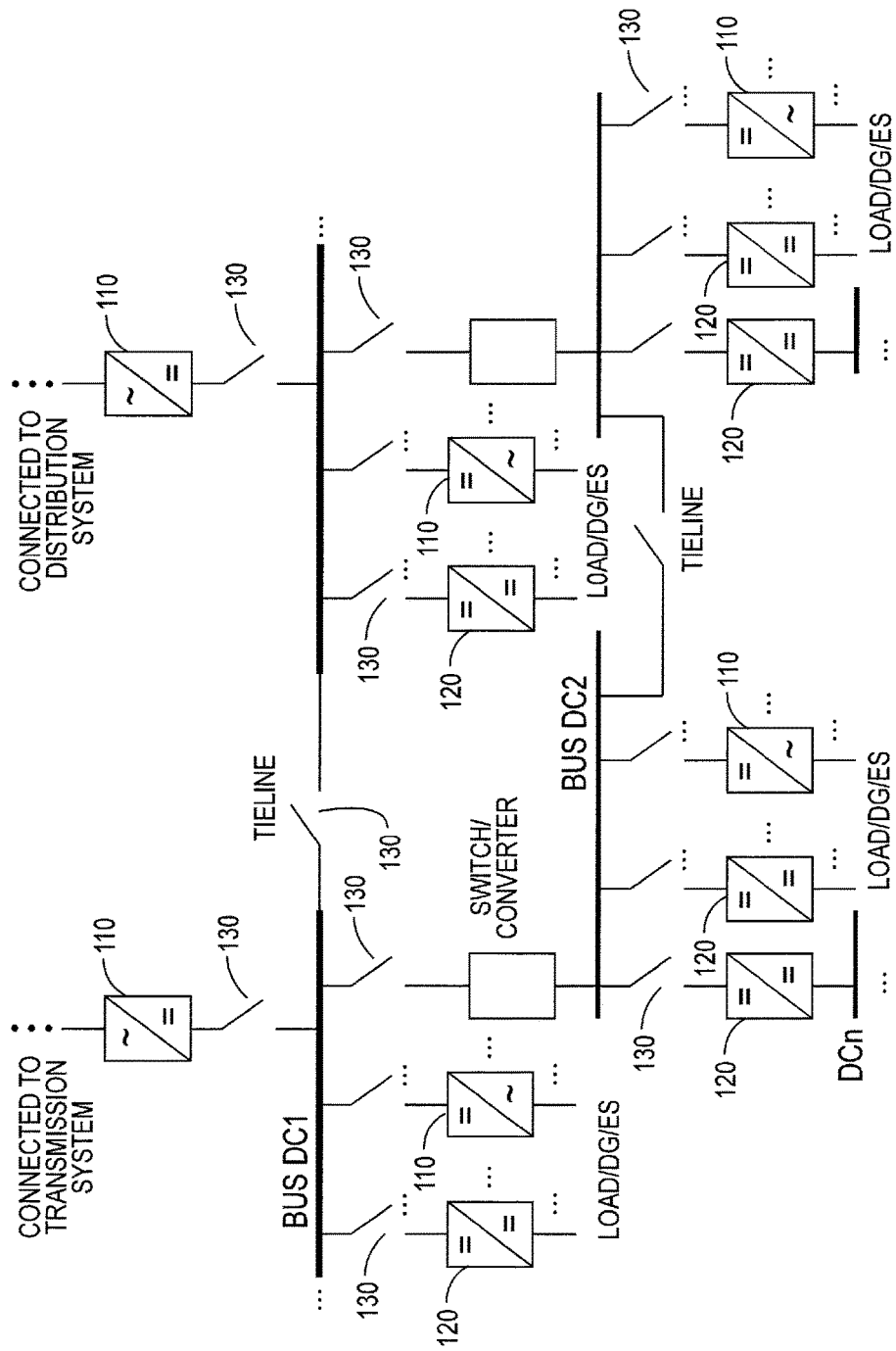
FIG. 1 is a schematic diagram illustrating an example DC distribution system to which the presently disclosed techniques may be applied.
Figure 2:
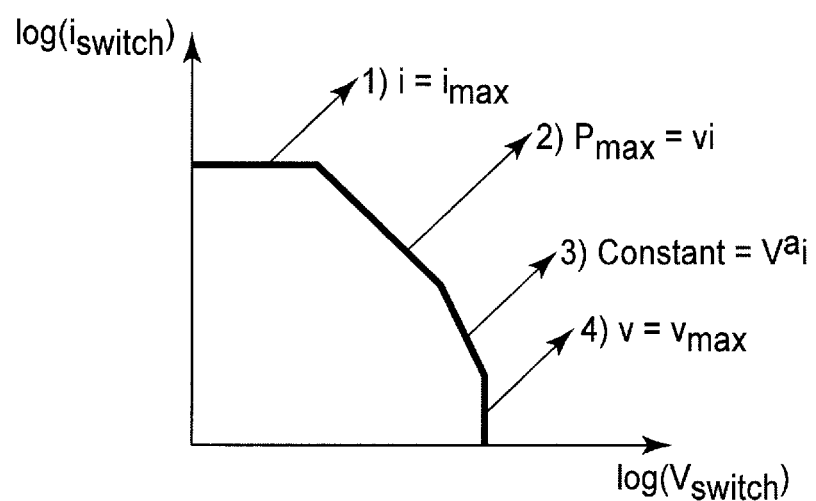
FIG. 2 illustrates a typical Safe Operating Area (SOA) for a power electronic switch.

In the claims and discussion that follow, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. Likewise, the use of the singular articles "a", "an" and "the" are not intended to preclude the presence of additional ones of the referenced item. Like terms refer to like elements throughout the description.

When there is a DC fault in a DC distribution that includes one or more DC converters, self-protection of source converters can take action and limit fault current flowing to or from the converter, so as to avoid damage to the power electronic switches in the converter. While there are various measures, using external devices or internal devices, to limit fault current magnitudes in a DC power system, the most convenient fault current limiting (FCL) devices in a converter-based DC distribution system are the converters themselves. Converter control ensures fast acting of FCL functions.

In conventional protection systems, protection selectivity is managed through coordination of protective devices. The operation of these protective devices can be coordinated by differentiating between fault signatures at different locations, such as different fault current magnitudes of upstream and downstream branches. In a DC distribution system, if fault current is limited due to safety requirements, it becomes a technical challenge to ensure timely and selective tripping of protective devices. Therefore, timely fault isolation and protection selectivity need to be achieved in alternative ways.

Several different protection strategies for HVDC systems have been proposed and/or are in operation. Most depend on DC circuit breakers, which are expensive in today's technology.

One HVDC protection scheme, described by L. Tang and B. Ooi in "Locating and Isolating DC Faults in Multi-Terminal DC Systems", IEEE Trans. On Power Delivery, Vol. 22, No. 3, July 2007, employs AC circuit breakers to cut off fault current, no-load DC switches to open affected DC lines, and handshaking techniques for exchanging information between neighboring converters and the no-load DC switches. However, AC circuit breakers in these systems need to wait until zero crossing to cut off fault currents. Further, due to zero current, cable recharging is required for restoration after faults.

Another approach, described by Carl Barker, "HVDC as bulk power transfer system," SUPERGEN Wind 5th Training Seminar, March 2011 (available at http://www.supergen-wind.org.uk/presentations.html), employs full-bridge AC/DC converters and fast isolating switches for a multi-terminal HVDC transmission system. According to the Barker presentation, a fault on a DC cable can be isolated in about 30-40 milliseconds by first limiting the fault currents from AC sources, using full bridge converters, and then isolating the fault cable from the system using fast switches. The complete multi-terminal HVDC system restoration according to this approach takes about 300-400 milliseconds.

According to still another approach, illustrated in European Patent Application EP1914162 A1, a medium-voltage DC (MVDC) protection scheme employs foldback current limiting converters, near zero voltage and current DC switches, and other protective devices, such as fuses, for a DC shipboard power system.

While the three approaches described above each provide some degree of protection in DC systems of various types, detailed protection concepts and algorithms are still needed for converter-based DC distribution systems that may have a meshed network structure.

The techniques, apparatus, and systems detailed below provide for system protection of converter-based DC distribution systems, through the use of various combinations of fault detection, fault current limiting, fault location, and fault isolation and reconfiguration. These techniques can be used for protection for DC distribution power systems, including low-voltage DC (LVDC) and medium-voltage DC (MVDC) distribution systems. According to various embodiments, as detailed below, DC protection can be achieved by one or more of: 1) fault detection and FCL by converters; 2) fast fault location and identification of a minimum affected area; and 3) fast fault isolation and system reconfiguration by DC switches. As will be seen, these techniques can be used to overcome several problems, some of which are specific to DC distribution systems, including lost protection selectivity when FCL is required in DC systems; reduced system reliability due to large or extensive affected area; and expensive DC protection systems based on costly DC circuit breakers.

Several embodiments of the DC protection systems described herein include three features:

1) An FCL function at each of one or more source converter units. Fault currents can be limited by FCL functions integrated into the source converters, in some embodiments. These source converters may include AC/DC rectifiers connected to AC sources or DC/DC converters connected to DC sources.

2) DC switches at appropriate locations in the DC distribution system. The DC switches provide fast open/close operation at low load currents, and provide galvanic fault isolation.

3) A centralized and/or distributed control system. In some embodiments, there is communication between converter control, control units, and DC switches. DC currents, current derivatives and voltages are measured at each DC branch and converter. These electrical signals, the converter control status, and the "open/close" status of DC switches are collected and sent to the relevant control unit(s).

As suggested above, the protection scheme can be based on any of several different architectures. In some embodiments, for example, there is one centralized unit, which can be located at one DC bus. In others, there may be multiple distributed units, located at each of several different DC buses. The DC bus control units can be integrated into components of an existing system, or may take the form of add-on functions or totally new control units.

Figure 3:
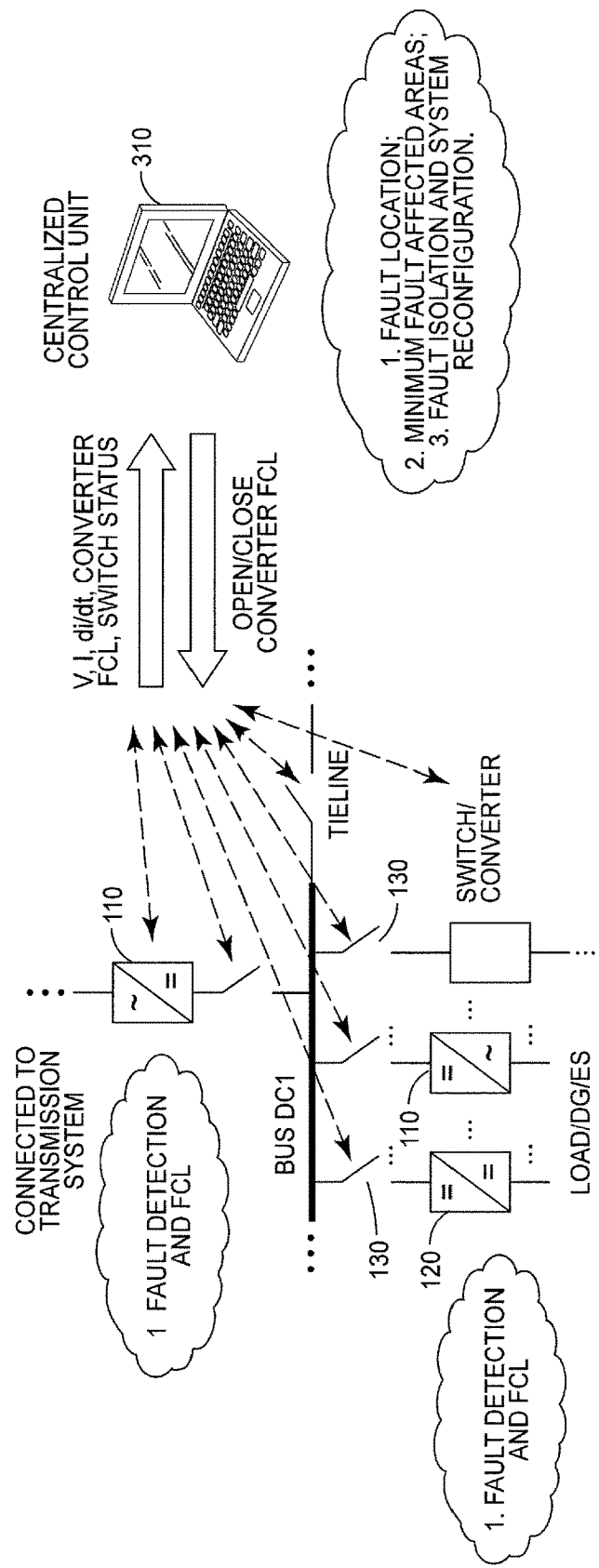
FIG. 3 illustrates a centralized architecture for a DC system protection scheme.

FIG. 3 illustrates the centralized architecture of an example system protection scheme. This may be applicable, for example, to a small DC shipboard power system, where a control unit 310 with fault protection functions is implemented as an add-on to an existing centralized Power and Energy Management System (PEMS). In the centralized architecture, information is exchanged between the central control unit 310 and essential elements of the disclosed protection system, including one or more DC converters 110, 120 and one or more switches 130.

Figure 4:
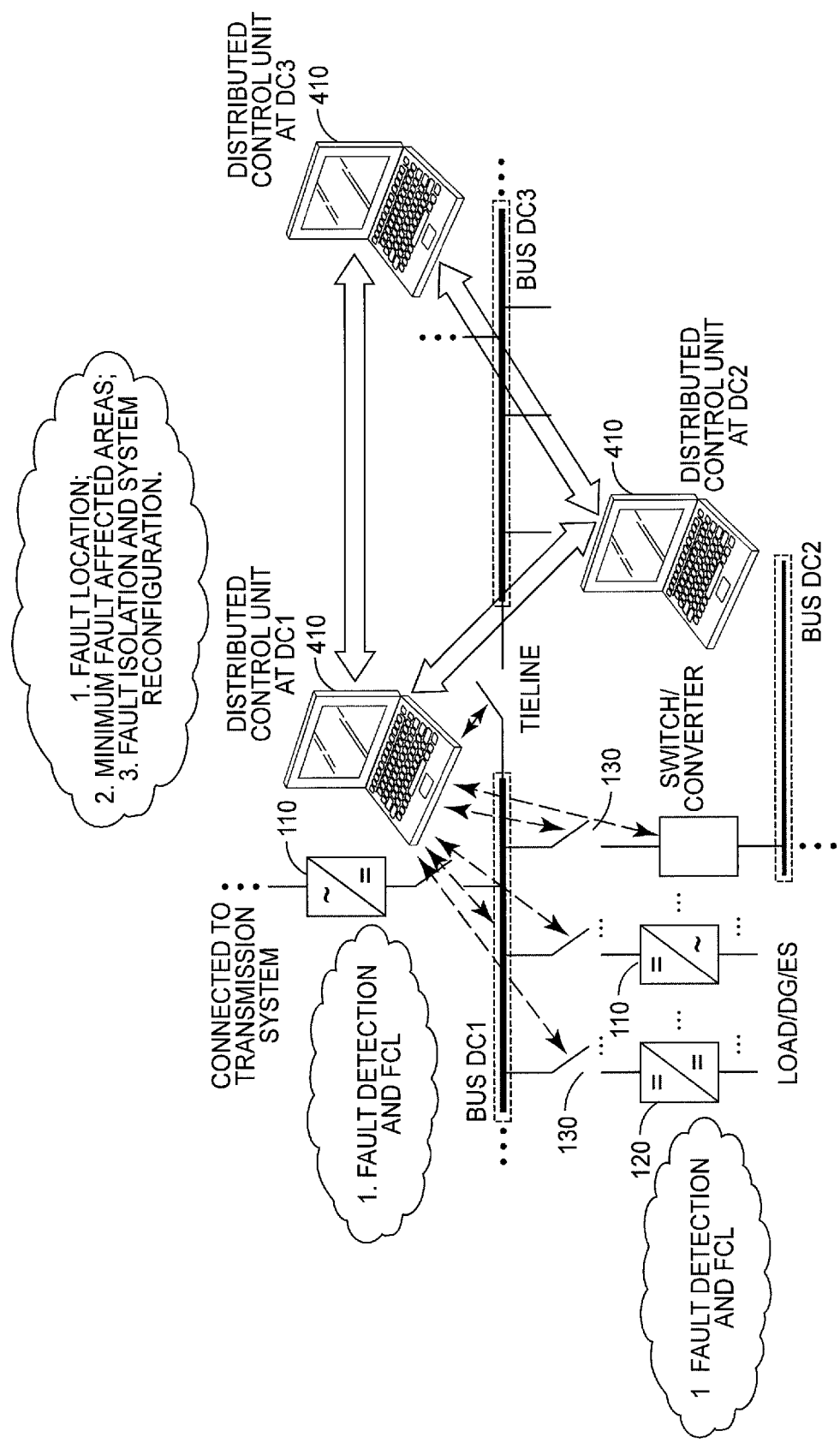
FIG. 4 illustrates a distributed architecture for a DC system protection scheme.

FIG. 4, on the other hand, shows an example of a system with a distributed architecture. In the distributed architecture, information is exchanged between distributed control units 410, which are located at each of one or more of the system's DC buses, and elements connected to the DC bus, including one or more DC converters 110, 120 and one or more switches 130. Each of the distributed control units 410 is connected to one or more of the neighboring control units 410 at neighboring DC buses. For a large and more general meshed DC distribution network, each DC bus could be an existing substation. The control unit 401 in such a system could be implemented as an add-on to an existing substation control unit. In some circumstances, e.g., if information exchange between neighboring DC buses within the subsystem is not enough to determine faulted area and minimum affected area, one of the distributed control units 410 may act as a master control unit.

Figure 6:
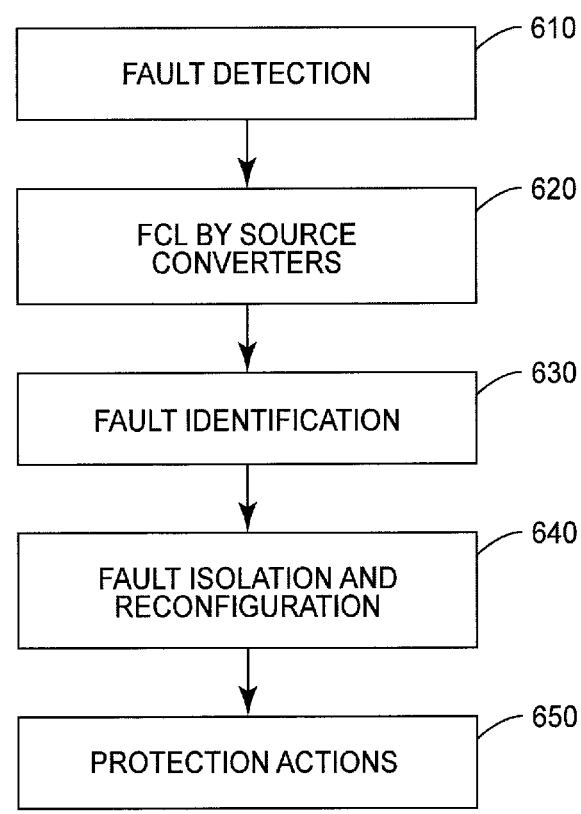
FIG. 6 is a process flow diagram illustrating an example method for system protection in a DC system.

The process flow diagram shown in FIG. 6 illustrates the operations performed in a system operating according to the presently disclosed techniques, whether the system uses a distributed or centralized control architecture.

First, as shown at block 610, a fault is detected. In a converter-based DC power system arranged according to the currently disclosed techniques, currents, current derivatives, and voltages are measured and monitored by each converter. When a DC fault occurs, the presence of a high current, high current derivative, and/or low voltage indicates the existence of the DC fault.

Upon detection of a fault, control of the source converter at which the fault is detected immediately enables the converter's FCL function, which limits the fault current contribution from the source to a predetermined level. This is shown at block 620. The fault currents in the protected DC distribution system are thus controlled to levels that are less than the nominal current levels, but higher than zero. The limited fault currents are low enough not to cause any arcing flash in the DC network, but high enough not to cause any difficulties in DC current sensors.

Depending on the specific types of converters, different FCL techniques can be employed. For examples, in thyristor-based current source converters, the firing angles of the thyristors can be increased to limit fault current. For voltage source converters, thyristors can be inserted into fault paths to reduce fault current. For some types of voltage source converters, such as full bridge cascaded multilevel converters, the converter topology itself allows direct control to reduce fault current.

After the fault is detected and the fault current in the protected DC distribution system is limited, the fault identification algorithms in the control unit 310 or control units 410 are executed to identify the faulted area, which can be a piece of equipment, a DC bus, a branch, or a group of equipment. This is shown at block 630. Past and present measurement data regarding voltages, currents, and/or current derivatives are inputs to the fault identification algorithms. Note that the present measurement data includes measurements that are affected directly by one or more converter fault currents, which have been limited to corresponding predetermined levels.

Some faulted areas may be identified quickly using only local measurements. In this case, fault identification may be carried out by individual distributed control units, in a system using a distributed control architecture, perhaps without any communication with neighboring control units. For example, a differential protection algorithm may be used to quickly locate any DC bus fault, based on the detection of a nonzero summation of all local currents flowing into and out of a particular bus. As another example, high current derivatives can be used to identify a line fault that is very close to measurement points.

Figure 5:
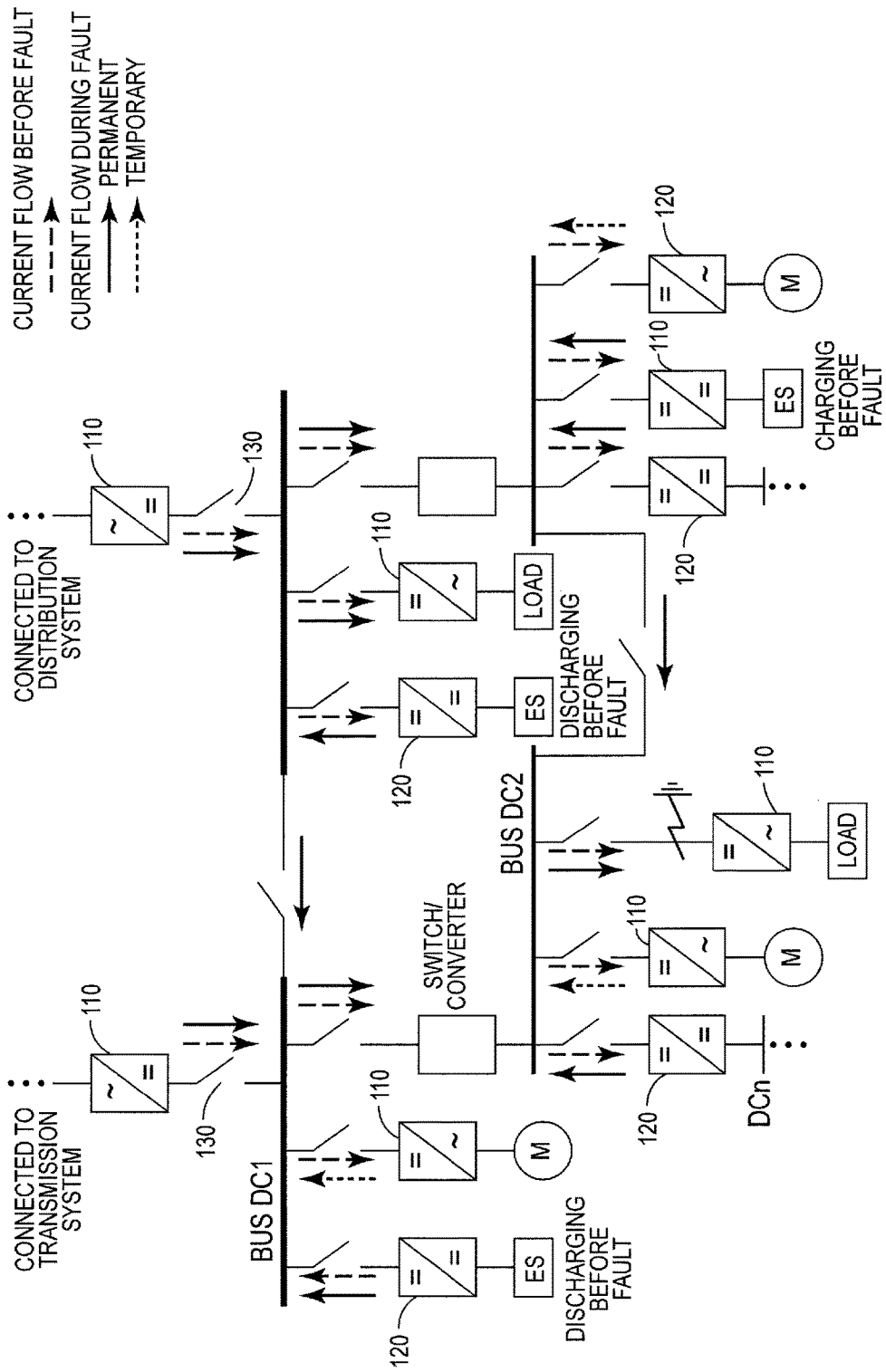
FIG. 5 illustrates changes in current directions after a fault in a DC system.

In a general DC distributed system, many faulted areas may be identified in a short time using system wide measurements. For example, fault tracing algorithms may be used to find a faulted branch in a short time, based on known system topology and measured current flow directions and/ or changes in current flow directions at different locations. Again, it will be appreciated that the measured current flow directions after the fault will include measurements of currents that are at least partly made up of converter fault currents, which are limited to respective predetermined levels. This approach is shown in FIG. 5, which illustrates current flows before and after a fault in an example system. After the fault, all currents from all sources, including the limited fault currents from DC converters, flow towards the fault location. The common branch among all of the different current flowing paths from all sources thus indicates the fault location. Note that a system-wide or network-wide fault identification algorithm, such as the fault tracing algorithm, can serve as a backup to one or more local fault identification algorithms. Thus, a system may utilize multiple fault identification algorithms operating simultaneously.

Once the faulted area has been identified, fast fault isolation and fast system reconfiguration algorithms are implemented, to minimize fault impacts. This is shown at block 640 of FIG. 6. Fault isolation algorithms are implemented to ensure high system security and safety requirement. For example, when a fault is identified on a DC bus, all tie line and branch DC switches connected to the DC bus are opened to isolate the faulted DC bus from the rest of the DC power system. When a fault is identified on a DC branch or line, the DC switches immediately upstream of the fault location or the DC switches on both ends of the faulted line are opened to isolate the faulted branch from the rest of the system. With both fast fault isolation and reconfiguration algorithms implemented, minimum fault affected area can be derived due to system reliability requirement or other requirements, such as minimum economic loss. Self-healing of the protected DC distribution system can also be achieved by reconfiguration considerations, at least partially. For example, some equipment in the faulted area can be reconnected to the healthy part of the system by alternative paths to ensure continuous power supply.

After the necessary actions for fault isolation and reconfiguration are determined, control commands are sent to the relevant DC switches to disconnect a minimum fault-affected area from the rest of the system, as shown at block 650. The source converters in the remaining part of the DC distribution system can deactivate their FCL functions; this may not be permitted until after certain voltage recoveries have been detected, in some systems. The minimum affected area is now isolated from the rest part of the system. Voltages in the remaining part of the system are recovered gradually, and the remaining part of the system is back to normal operation.

Depending on system or component fault tolerant capability, the consumed time at each step of the disclosed protection should be different. If a system has many rotational loads, for example, then component and system fault tolerance is high, and allowed fault clearance times could be several hundred milliseconds. This is not difficult to accomplish by the disclosed protection method. If a system has high reliability requirements, the allowed fault clearance time could be dozens of milliseconds, which is most challenging to low load DC switches. This will most likely require fast power electronics-based technologies.

In the previous description, it was assumed that a permanent fault occurred in the protected DC distribution system. If the fault is a temporary fault, on the other hand, system voltages gradually recover to their normal levels, by the residual fault currents from source converters, and the low voltages used to indicate fault existence disappear. In this case, the execution of the disclosed DC fault protection and location method would then be interrupted. If converter control and DC switches have already taken action, these actions will be reversed. The protected system is back to normal operation.

Figures 7A, 7B:
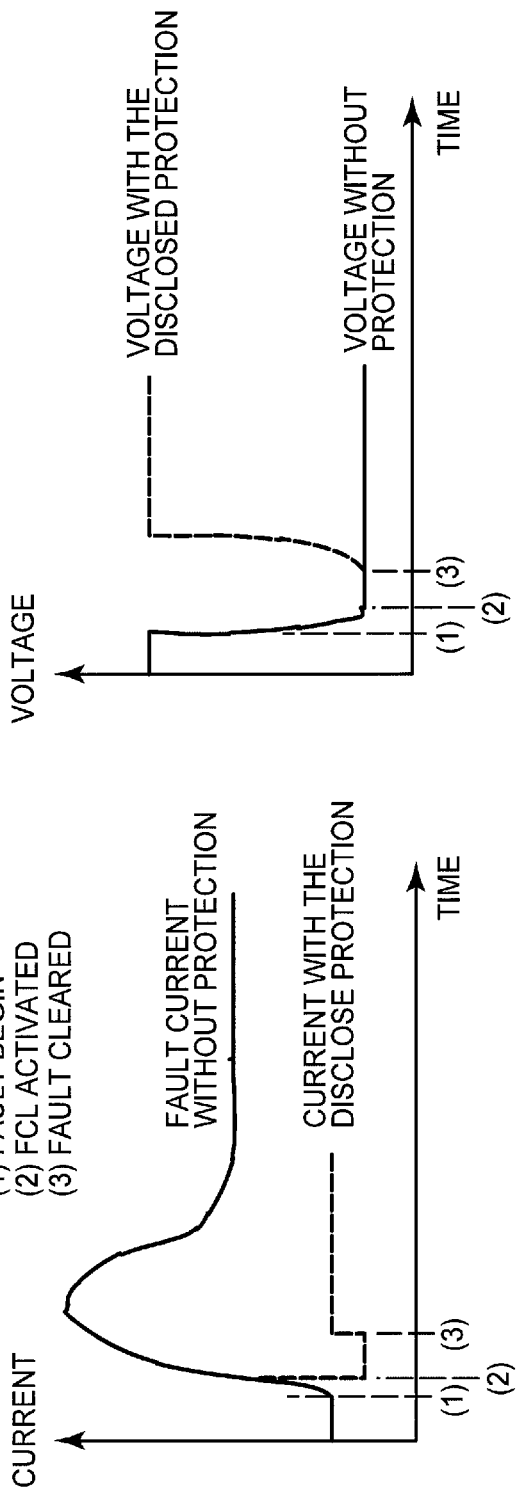
FIGS. 7A and 7B illustrate typical fault currents and fault voltages, respectively, with and without fault-current limiting.

FIGS. 7A and 7B illustrate an example of a system current and a corresponding voltage, respectively, both without fault protection and with the disclosed protection methods. With the fault current from a DC converter limited to a low level, the damage of a DC fault to the protected system is limited. The limited current thus provides for adequate time for the control unit(s) to determine minimum fault affected area and system reconfiguration, without adverse impacts on the stable operation of the connected utility transmission system and fault tolerance of the protected DC distribution system, including required tolerance of various types of loads. With fault currents limited, technical requirement on protective devices are much reduced. Fast "open/close" of DC switches can be achieved with low cost. The disclosed protection techniques thus can also be featured in fast fault removal and fast system recovery by fast fault detection, fast fault identification, and fast fault isolation and reconfiguration actions.

Given the above detailed examples, it will be appreciated that a protection system for a DC distribution system may include any or all of the following operational features:
1) fault detection by converters and protection functions in the control units, e.g., according to:
   a. high current derivative or high current;
   b. low voltage; and
   c. any combination of above, or other fault signatures.
2) fault-current limiting (FCL) at each source converter where faults are detected;
3) fault identification to identify faulted area;
4) fault isolation and reconfiguration to minimize fault impacts;
5) Protective actions of fast "open/close" DC switches and deactivate FCL of source converters to isolate fault and reconfigure the protected system;

Likewise, such a protection system may include any or all of the following components:
1) One or more control units to:
   a. collect and store past and present voltages, currents, current derivatives, other fault signatures, status of converter control and DC switches;
   b. determine fault location according to differential protection and tracing algorithms;

c. determine the minimum fault affected area according to fault location and system reliability;

d. issue commands to converters and DC switches to isolate faults and reconfigure the protected system;

2) Source converters, configured to:

a. fast limit fault current contributions from sources;

b. communicate with the central and/or local control unit.

3) DC switches that:

a. can be opened and closed quickly, at low load current; and b. are controlled in communication with the central and/or local control unit(s).

It will be appreciated that these control units may be implemented according to a centralized architecture, featuring a centralized control unit and a communication system between the central control unit with system wide converters and DC switches. Alternatively, the control units may be implemented according to a distributed architecture, including distributed control units at DC buses and a communication system linking the control units at DC buses with converters and DC switches connected to the DC bus and also between neighboring control units.

The disclosed protection systems and techniques may be used for protection for DC distribution power systems, including LVDC and MVDC distribution systems. These techniques avoid lost protection selectivity when FCL is required in DC systems, and provide improved system reliability, by minimizing the affected areas and providing for self-healing by system reconfiguration. These techniques also are most cost-effective than those that rely on costly DC circuit breakers. The fault current limiting and fast DC protection reduce adverse impacts by high fault current on equipment and DC network, while providing for fast and accurate fault location, based on the presence of converter fault currents at predetermined fault current levels. The techniques provide adaptive protection for different system configurations there is no need for adaptive settings for each DC switch when the system configuration is changed.

Fast system isolation and reconfiguration actions are enabled by limiting fault current to a low but nonzero value, which enables fast DC switch "open," without requiring extra DC cable recharging. Cost savings are facilitated by employing existing converter control, existing central control unit, and low load DC switches.

It will be appreciated that the disclosed techniques can be extended to address multiple DC fault locations. Multiple faulted areas can be identified and multiple affected areas can be determined to minimize fault impacts within different subsystems. The disclosed techniques can be extended to AC/DC hybrid applications, where timely fault isolation and protection coordination is lost due to fault current limiting by converters. For DC distribution systems with radial type topologies, fault location can be easily identified, and thus communication requirement will be much reduced.

In the protection systems described above, it is assumed that a control system, whether centralized or distributed, performs a fault identification process and decides which protection devices (e.g., switches) to activate, based on the fault identification results. Another approach, aspects of which can be combined with the former approach, is to provide for the automatic tripping of one or more protection devices in the system, in response to a detected fault. These protection devices can be coordinated, so that a minimum number of protection devices are activated for a given fault, thus minimizing the affected area. This coordination can be planned with the converter fault currents supplied by the DC converters in mind.

With this approach, the equipment/devices related to DC protection include converters with fault-current limiting (FCL) capability, and low fault-current protective devices, such as low-current DC Circuit Breakers (DCCBs), fuses, etc. Converters should have fault isolation capability and no-load DC switches for galvanic isolation. Protection coordination is provided between protective devices and converters at the same location and/or at different locations. In some cases, there may be no separate protective devices involved, where the coordination is instead between multiple converters.

Figure 8:
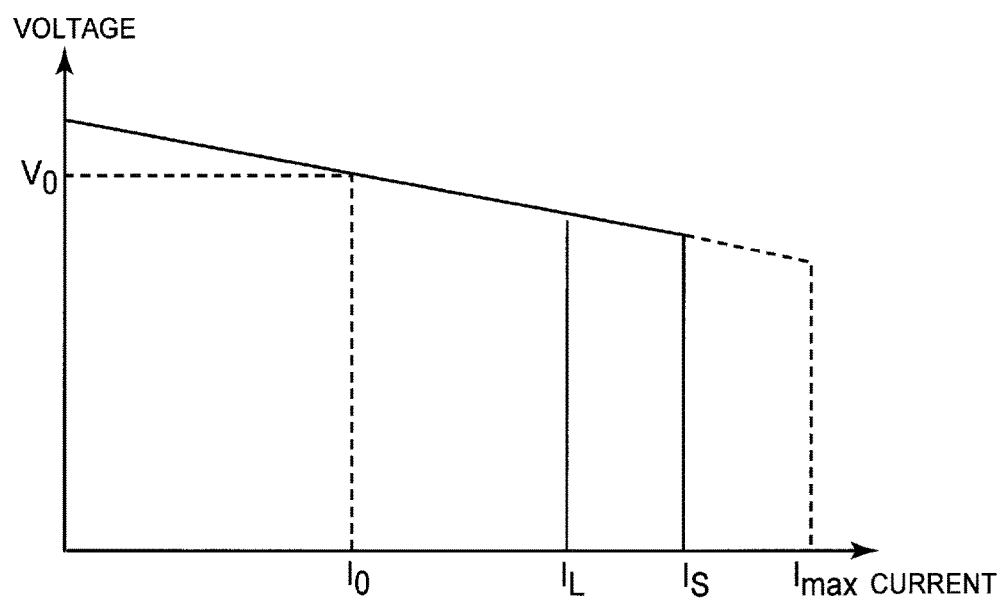
FIG. 8 shows an example V-I characteristic for a converter with a constant fault-current limiting function.

As described above, FCL operation of a converter is activated when there is a fault. In order to coordinate converters and protective devices, the fault currents should be controlled to predetermined, low-level (but non-zero) constant currents. FIG. 8 illustrates an example V-I characteristic for a converter with a constant FCL function. V0 and I0 are nominal voltage and current levels, respectively. Imax is the maximum current that is allowed to pass through the converter. In this converter, the fault current can be controlled to either of two different constant levels, $I_S$ and $I_L$, both of which are less than the maximum allowed current. Depending on upstream and downstream protective devices to be coordinated, the constant currents can be higher or lower than its nominal current. $I_S$ is a constant current level with short time delay, while IL is a lower constant current level, having a long time delay. After a fault occurs, the converter detects the fault and starts its FCL operation as shown in FIG. 8, where the fault current is first limited to a higher level ($I_L$) for a first, relatively short duration time, and then limited to a lower level ($I_S$), for a longer duration time.

For protective devices, such as fuses, DCCBs, there could be three levels of settings to trip a fault. The three levels correspond to the current levels that will cause the device to trip (i.e., open) instantaneously, after a short time delay, and after a long time delay. Traditional Time-Current Curves (TCCs) are used to determine tripping times at the three different current levels.

As noted above, for converters with FCL implemented, there may be only two levels of settings in the converter control for FCL, corresponding to a short time delay and a long time delay. The delays of converters should be selected to enable protection coordination between downstream and upstream protective devices. To ensure selectivity, the time delays should be longer than the respective short/long time delays of downstream protective devices, and shorter than time delays of upstream protective devices.

As noted above, distributed generation systems may be connected to a DC distribution system at different locations. When there is a fault, the current contribution from distributed generators may violate the discrimination rule of different current magnitudes in upstream and downstream branches. Thus, blocking circuits, such as diode, are implemented with distributed resources to prevent reverse current flow during faults. These blocking circuits are activated immediately after a fault is detected.

Figure 9:
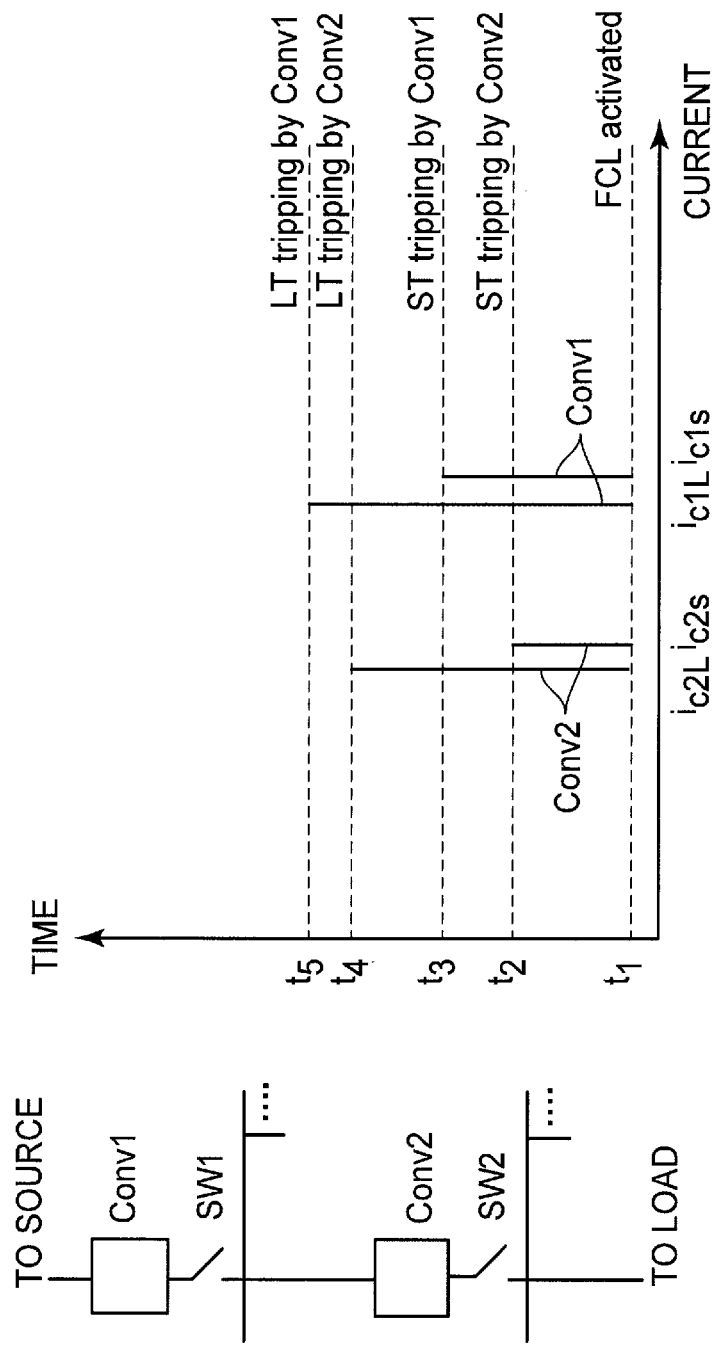
FIG. 9 illustrates an example of protection coordination between different converters.

FIG. 9 illustrates the coordination between upstream and downstream converters in an example configuration. The straight vertical lines indicate the constant current settings and the corresponding time delay settings. In this example, the downstream converter system Conv2 has lower constant current settings Ic2S and Ic2L, and shorter short/long time delays t2 and t4, while the upstream converter system Conv1 has higher constant current settings Ic1s and Ic1L and longer short/long time delays t3 and t5. These settings are embedded into the converter controls of Conv1 and Conv2.

The different current settings of the downstream and upstream converters are due to other sources/loads connected to the downstream and upstream buses. If there are no other sources/loads connected to the buses, the current settings of the downstream and upstream converters are the same. The protection selectivity in this case can be achieved by coordinating different time delays of the downstream and upstream converters. This coordination scheme can also be applied to new DC protective devices, which do not use traditional Time-Current Curves (TCC) to determine response time at different fault current levels.

Figure 10:
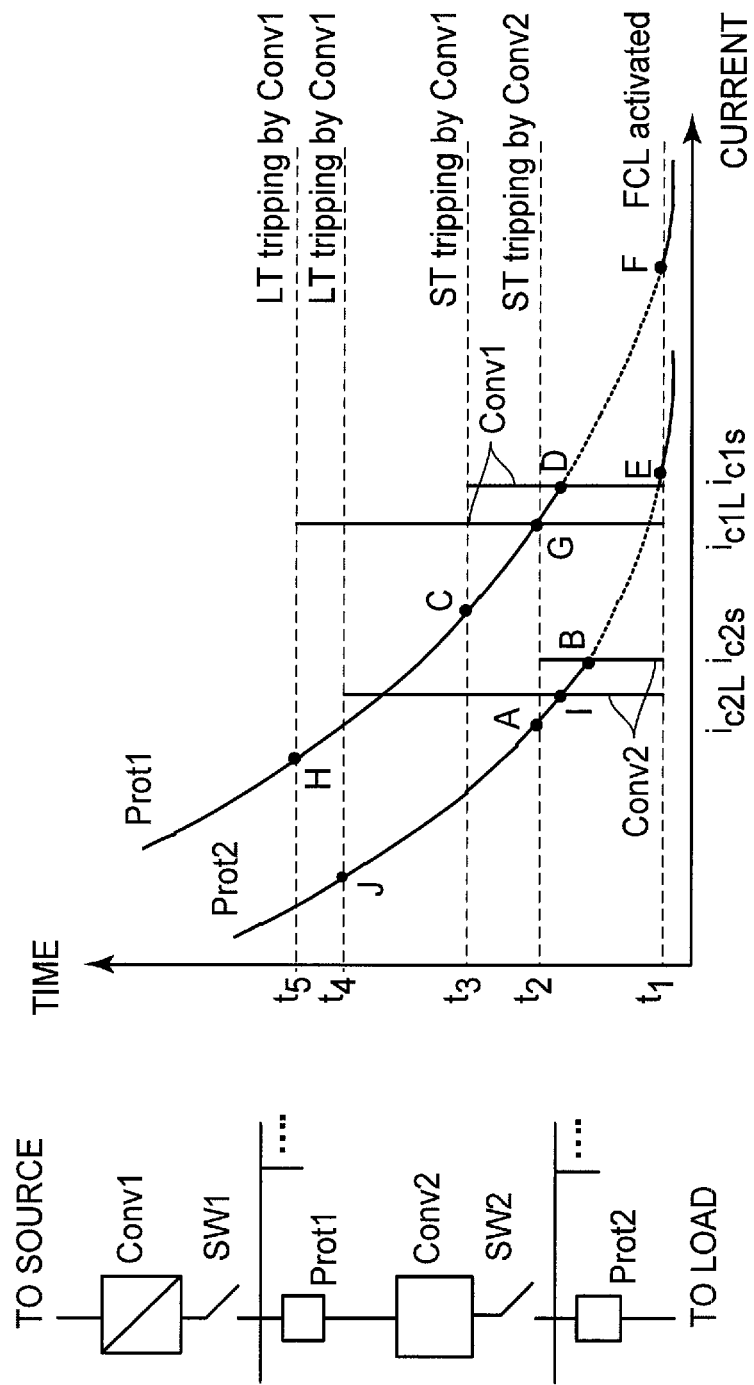
FIG. 10 illustrates an example of protection coordination between converters and protection devices.

FIG. 10 illustrates the instantaneous and short time delay coordination on a branch containing two converters (Conv1 and Conv2) and two protective devices (Prot1 and Prot2). The two protective devices are implemented with reverse Time-Current Curves (TCCs). The locations of the converters and protective devices are also indicated in the figure. Prot2, Conv2, Prot1 and Conv1 are located from downstream to upstream sequentially.

When there is a fault below and close to Prot2 and if the fault current is very high, Prot2, which can be a fast fuse, may trip very fast, as indicated beyond point E, before FCL takes effect. Similarly, Prot1 will trip as indicated beyond point F if the fault is below and close to Prot1. After converter FCL takes actions at t1, the currents seen at different locations are limited to different fixed values, as shown by the straight vertical lines in FIG. 10. Current limiting level of Conv1/Conv2 is selected between point C/A and D/B. Point DID indicates the lower time limit and upper current limit of Prot1/2 in short time delay operation, which is determined by the constant current limit of Conv1/2. Point C/A indicates the upper time and lower current limit of Prot1/2, which is determined by short time delay of Conv1/2. Therefore, Prot1/2 can trip with short time delay on its TCC between [C, D]/[A, B], as indicated by the dotted straight lines in red and orange. Similar, as shown in the figure, Prot1/2 can also operate with long time delay between [G, H]/[I, J]. In this way, the selective coordination between the converters and the protective devices is achieved without any communication.

Given the examples detailed above with respect to FIGS. 8-10, it will be appreciated that a protection system for a DC distribution system according to this second general approach may include any or all of the following operational features:

1) DC protection coordination, as shown in FIGS. 9 and 10, including:
   a. constant fault current limiting of converters at faults; and
   b. coordination between converter controls and DC protection devices; and/or
   c. coordination between controls of different converters;
2) DC protective devices capable of fast fault isolation at a low current level that is within the tolerable range of DC current sensors.
3) DC converter systems that include:
   a. constant fault current limiting control;
   b. fault current isolation devices;
   c. DC no-load switches for galvanic isolation.

DC protection can thus be achieved using 1) cost-effective DC protection devices; 2) converter control with FCL and fault isolation; 3) and protection coordination between different types of DC protective devices. This approach overcomes the lost protection reliability and selectivity that might otherwise occur when FCL is implemented in DC systems, and overcomes difficulties in protection coordination when different types of DC protective devices are implemented. Another advantage of this approach is its reduced dependency on communications between components of the DC distribution system. This approach also provides cost savings, by employing existing converter control capabilities and DCCBs with reduced DC current quenching requirements. This approach can also be implemented in a manner that is complementary to the first approach outlined earlier (with active identification and isolation of the fault), e.g., for subsystems that are included in a meshed DC distribution system.

Figure 11:
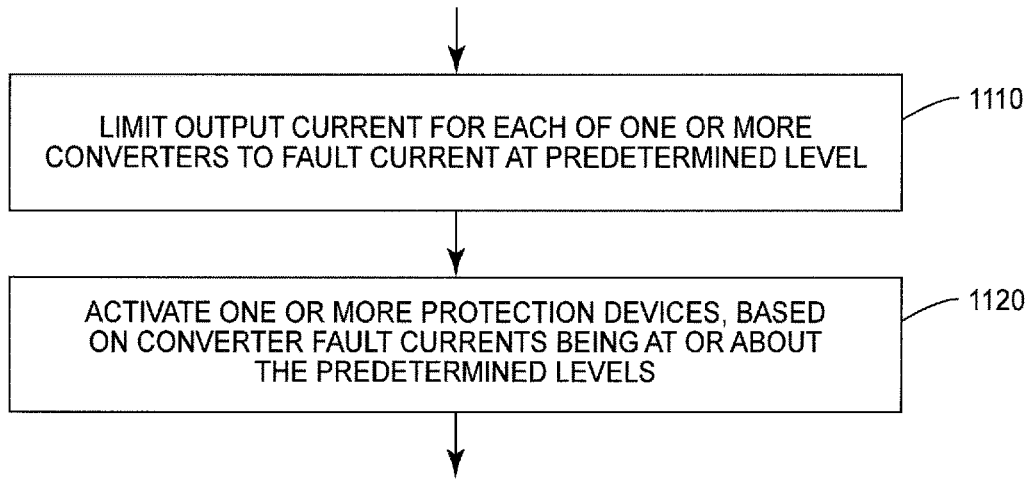
FIG. 11 is a process flow diagram illustrating an example method for protecting a direct-current (DC) electric power distribution system.

In view of the preceding discussion, it will be appreciated that FIG. 11 is a process flow diagram illustrating a generalized method for protecting a direct-current (DC) electric power distribution system that includes one or more DC converters and one or more loads, connected by DC buses. The illustrated method, which is carried out in response to the detection of a fault somewhere in the system, is general enough to cover both of the approaches detailed above. As shown at block 1110, the method begins with limiting an output current of each of one or more of the DC converters so that each of the limited DC converters outputs a converter fault current at or about a corresponding predetermined fault current level. As shown at block 1120, after the current limiting of the one or more converters has taken place, one or more protection devices in the system are activated, where the activating at least partly depends on the converter fault currents being at or about the predetermined fault current levels.

In some embodiments, limiting the output current for one or more of the DC converters includes first limiting the output current to a first fault current level, for a first interval of time, and subsequently limiting the output current to a second fault current level. In some embodiments, limiting the output current of one of the DC converters is performed by directly controlling the DC converter to produce the converter fault current at or about the corresponding predetermined fault current level.

In some embodiments, the activating of the one or more protection devices comprises identifying a location for the detected fault, based on measurements of currents on the DC buses, where said identifying at least partly depends on the converter fault currents being at or about the predetermined fault current levels, and opening one or more DC switches in the system, based on the identified location of the detected fault. An example of this approach was illustrated in FIG. 8. Response time of DC switches can be coordinated based on their upstream and downstream locations in the protected distributed system.

In some of these embodiments, the location for the detected fault is based on measurements on the DC buses of one or more of: current derivatives; voltages; and current directionalities. The opening of one or more DC switches may include, for example, opening all tie line and branch DC switches connected to a first DC bus in response to identifying the first DC bus as the location of the detected fault. Alternatively, the opening of one or more DC switches in the system may include opening a DC switch immediately upstream of an identified fault location in response to identifying a DC branch as the location of the detected fault. In some embodiments, after the one or more DC switches, at least a portion of the system is reconfigured, by activating one or more alternative paths for connecting equipment affected by said opening of one or more DC switches. Further, in some embodiments, after the one or more DC switches are opened, the system determines that the fault has been isolated and, in response to said determining, discontinues the limiting of output current in each of the DC converters that is limited to its corresponding predetermined fault current level. Determining that the fault has been isolated may be done, for example, by observing the return of voltage levels in the system to within a normal or expected range.

Some embodiments of the method illustrated generally in FIG. 11 may involve the automatic opening of protection devices based on coordination between the devices, without the involvement of a centralized or distributed control system. In some of these embodiments, one or more protection devices are automatically opened, where the opening of each protection device is based on a respective device current exceeding at least one respective threshold for a respective period of time, and wherein the thresholds are based on the predetermined fault current levels.

Figure 12:
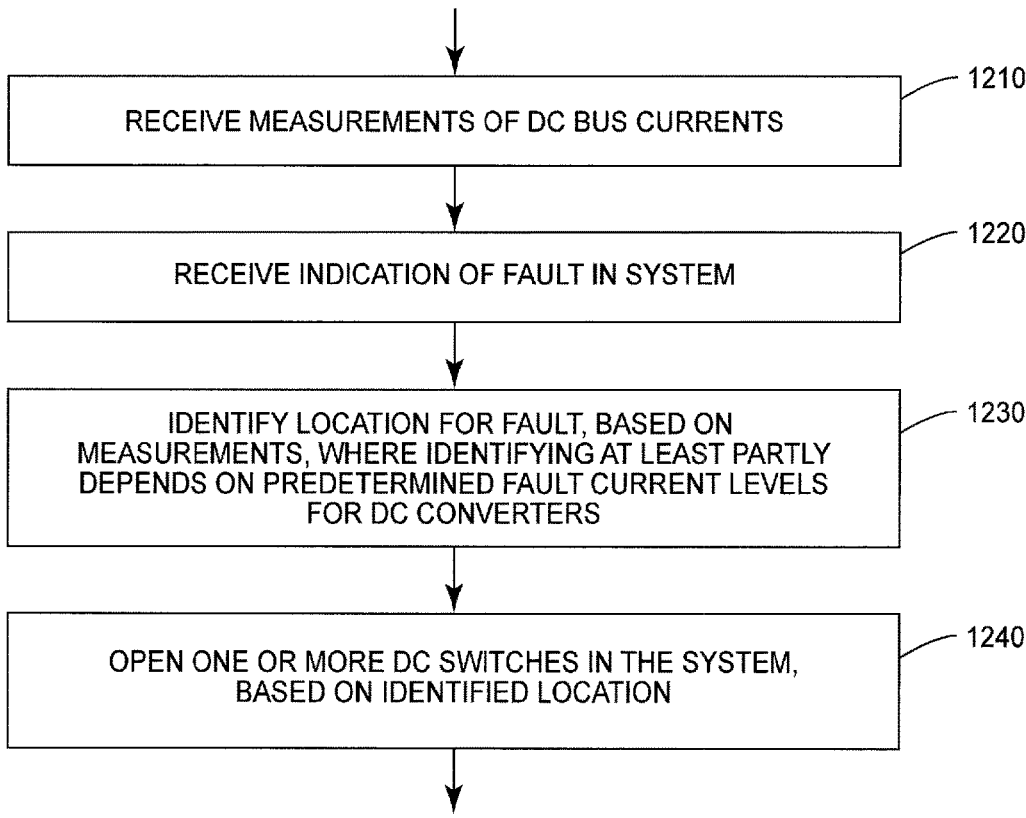
FIG. 12 is a process flow diagram illustrating another example method for protecting a direct-current (DC) electric power distribution system.

Some embodiments of the method illustrated in FIG. 11 may be carried out using one or more control units, which may be implemented in a centralized or distributed architecture, as discussed above. FIG. 12 is a process flow diagram illustrating an example method for protecting a direct-current (DC) electric power distribution system that includes one or more DC converters and one or more loads, connected by DC buses, as implemented by one or more such control units. It will be appreciated that the method shown in FIG. 12, and the variants described below, is a special case of the method shown in FIG. 11, and overlaps with some of the variants described above.

The process illustrated in FIG. 12 begins, as shown at block 1210, with the receiving of measurements of DC bus currents. The control unit(s) may receive these measurements periodically, for example, from each of a number of monitoring points. Of course, these measurements may be received in conjunction with other measurement data, including voltage measurements, current derivative measurements, etc.

As shown at block 1220, the control unit (or units) receives an indication of a fault in the system. In response, a location for the indicated fault is identified, as shown at block 1230, based on the measurements of DC bus currents taken both before and after the fault occurs. The identification of the fault location at least partly depends on a predetermined, limited, fault current level for at least one of the DC converters. Finally, as shown at block 1240, one or more DC switches in the system are opened, based on the identified location of the indicated fault.

In some embodiments, external control is provided by the control unit (or units) to at least one of the DC converters, to produce its corresponding converter fault current. In some embodiments, identifying the location for the indicated fault is further based on measurements on the DC buses of one or more of current derivatives, voltages, and current directionalities.

In some embodiments, opening one or more DC switches in the system comprises opening all tie line and branch DC switches connected to a first DC bus in response to identifying the first DC bus as the location of the indicated fault. In others, opening of one or more DC switches in the system comprises opening a DC switch immediately upstream of an identified fault location in response to identifying a DC branch as the location of the indicated fault.

In some embodiments or instances of the method shown in FIG. 12, at least a portion of the system is reconfigured, after the opening of one or more switches, by activating one or more alternative paths for connecting equipment affected by the opening of the DC switches. In some embodiments or instances, the illustrated method continues with, after the opening of one or more DC switches, determining that the fault has been isolated and, in response to so determining, discontinuing the limiting of output current in each of the DC converters that is limited to its corresponding predetermined fault current level.

Figure 13:
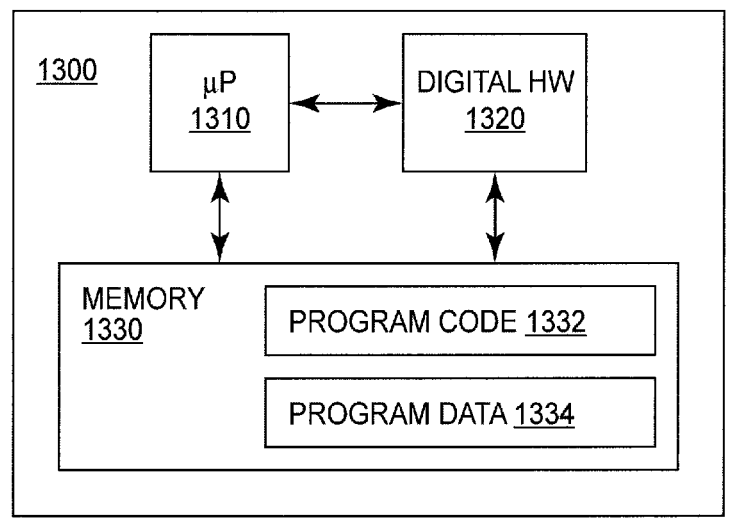
FIG. 13 shows an example controller circuit configured according to some embodiments of the present invention.

As noted above, the method shown in FIG. 12, and its variants, may be implemented in one or more control units. FIG. 13 is a block diagram illustrating an example configuration for a controller circuit 1300, which may be used to implement all or a portion of a DC protection system according to any of the techniques described above. The pictured example includes one or more microprocessors or microcontrollers 1310, as well as other digital hardware 1320, which may include digital signal processors (DSPs), special-purpose digital logic, and the like. Either or both of microprocessor(s) 1310 and digital hardware 1320 may be configured to execute program code 1332 stored in memory 1330 along with program data 1334. Because the various details and engineering tradeoffs associated with the design of processing circuits are well known and are unnecessary to a full understanding of the invention, additional details are not shown here.

The program code 1332 stored in memory circuit 1330, which may comprise one or several types of memory such as read-only memory (ROM), random-access memory, cache memory, flash memory devices, optical storage devices, etc., includes program instructions for carrying out one or more of the methods described above, including any of the methods discussed in connection with FIG. 12, in several embodiments. The program data 1334 include various pre-determined system configuration parameters, such as the parameters associated with the predetermined fault current levels for one or more DC converters, as well as parameters determined from system measurement.

Embodiments of the techniques and systems disclosed herein, then, include direct-current (DC) electric power distribution systems that include: one or more DC converters and one or more loads connected by DC buses, where at least one of the DC converters is operable to produce a converter fault current at or about a predetermined, limited fault current level in response to a detection of a fault or under the control of a controller; one or more DC switches, where each DC switch is operative to disconnect at least a portion of a DC bus or a DC branch; and a controller circuit configured to carry out a method like that shown in FIG. 12. Thus, for example, a controller circuit 1300 may be configured to: receive measurements of DC bus currents; receive an indication of a fault in the system; identify a location for the indicated fault, based on the measurements of DC bus currents, where said identifying at least partly depends on the converter fault current being at or about its respective predetermined, limited, fault current level for at least one of the DC converters; and open one or more of the DC switches, based on the identified location of the indicated fault.

In some embodiments of these DC electric power distribution systems, the controller circuit is further configured to provide external control to at least one of the DC converters to produce the corresponding converter fault current, in response to the indication of the fault in the system. The controller circuit may be configured to identify the location for the indicated fault based further on measurements on the DC buses of one or more of current derivatives, voltages, and current directionalities, in various embodiments. It will be appreciated that the several variations discussed above for the method shown in FIG. 12 are equally applicable to the system described here.

With the above-described circuits, systems, methods, and other variations and extensions in mind, those skilled in the art will appreciate that the foregoing description and the accompanying drawings represent non-limiting examples of the systems and apparatus taught herein. As such, the present invention is not limited by the foregoing description and accompanying drawings. Instead, the present invention is limited only by the following claims and their legal equivalents.

What is claimed is:

1. A method for protecting a direct-current (DC) electric power distribution system that includes one or more loads, one or more DC buses, and one or more converters, the converters comprising one or more AC/DC converters or one or more DC/DC converters, or both, the plurality of converters each having a fault current limiting function integrated into the converter, the method comprising, in response to a detection of a fault in the system:
   coordinatively limiting, via activation of the fault current limiting function of each of the plurality of converters, an output current of each of a plurality of the converters so that each of the plurality of converters outputs a limited DC current, the limited DC current being coordinated such that at least one of a current level and a duration of the limited DC current for at least one of the plurality of converters during activation of the fault current limiting function is different than the current level and/or duration of the limited DC current of another one of the plurality of converters;
   selectively activating one or more protection devices in the system to isolate the fault, wherein said selectively activating at least partly depends on the limited DC currents being discriminative with respect to at least one of current direction and current level; and
   deactivating, after isolation of the fault, the fault current limiting function of each of the plurality of converters that are outside the portion of the system that has been isolated by isolation of the fault.

2. The method of claim 1, wherein limiting the output current of one of the converters comprises directly controlling the converter to produce the limited DC current at or about a predetermined current level.

3. The method of claim 1, wherein said activating comprises:
   identifying a location for the detected fault, based on at least measurements of currents on the DC buses, wherein said identifying at least partly depends on the limited DC currents being at or about a predetermined current level; and
   opening one or more DC switches in the system, based on the identified location of the detected fault.

4. The method of claim 3, wherein identifying the location for the detected fault is based on measurements on the DC buses of one or more of:
   current levels;
   current derivatives;
   voltages; and
   current directionalities.

5. The method of claim 3, wherein said opening of one or more DC switches in the system comprises opening all tie line and branch DC switches connected to a first DC bus in response to identifying the first DC bus as the location of the detected fault.

6. The method of claim 3, wherein said opening of one or more DC switches in the system comprises opening a DC switch immediately upstream or DC switches on both sides of an identified fault location in response to identifying a DC branch as the location of the detected fault.

7. The method of claim 3, further comprising, after said opening of one or more DC switches, reconfiguring at least a portion of the system by activating one or more alternative paths for connecting equipment affected by said opening of one or more DC switches.

8. The method of claim 3, further comprising, after said opening of one or more DC switches:
   determining that the fault has been isolated; and,
   in response to said determining, discontinuing the limiting of output current in each of the converters that is limited to its corresponding predetermined current level.

9. The method of any of claim 1, wherein limiting the output current for one or more of the plurality of converters comprises first limiting the output current to a first limited current level, for a first interval of time, and subsequently limiting the output current to a second limited current level.

10. The method of claim 9, wherein said activating comprises an automatic opening of one or more protection devices, wherein the opening of each protection device is based on a respective device current exceeding at least one respective threshold for a respective period of time, and wherein the thresholds are based on the predetermined current levels.

11. A method for protecting a direct-current (DC) electric power distribution system that includes one or more loads, one or more DC buses, and a plurality of converters, the plurality of converters comprising one or more AC/DC converters or one or more DC/DC converters or both, the method comprising:
   receiving measurements of DC bus currents;
   receiving an indication of a fault in the system;
   activating a fault limiting current function that is integrated into each of the plurality of converters;
   coordinating an output of a limited DC current by the plurality of the converters such that, via activation of the fault limiting current function, at least one of a current level and a duration of the limited DC current outputted by at least one of the plurality of the converters is different than the current level and/or the duration of the limited DC current outputted by another converter of the plurality of converters;
   identifying a location for the indicated fault, based on the measurements of DC bus currents, wherein said identifying at least partly depends on a predetermined, limited, DC current level for at least one of the converters;
   opening one or more DC switches in the system, based on the identified location of the indicated fault; and
   deactivating, after isolation of the fault, the fault current limiting function of each of the plurality of converters that are outside the identified location of the indicated fault.

12. The method of claim 11, further comprising providing external control to at least one of the converters to produce its corresponding predetermined, limited, DC current.

13. The method of claim 11, wherein identifying the location for the indicated fault is further based on measurements on the DC buses of one or more of:
   current levels;
   current derivatives;
   voltages; and
   current directionalities.

14. The method of claim 11, wherein said opening of one or more DC switches in the system comprises opening all tie line and branch DC switches connected to a first DC bus in response to identifying the first DC bus as the location of the indicated fault.

15. The method of claim 11, wherein said opening of one or more DC switches in the system comprises opening a DC switch immediately upstream or DC switches on both sides of an identified fault location in response to identifying a DC branch as the location of the indicated fault.

16. The method of claim 11, further comprising, after said opening of one or more DC switches, reconfiguring at least a portion of the system by activating one or more alternative paths for connecting equipment affected by said opening of one or more DC switches.

17. The method of claim 11, further comprising, after said opening of one or more DC switches:
   determining that the fault has been isolated; and,
   in response to said determining, discontinuing limiting of output current in each of the converters that is limited to its corresponding predetermined current level.

18. A direct-current (DC) electric power distribution system, comprising:
   multiple DC buses, each either directly or through converters associated with one or more power sources and one or more loads, connected by branches and converters, wherein at least one of the converters is an AC/DC converter or DC/DC converter operable to produce a respective converter current at or about a predetermined, limited, DC current level in response to a detection of a fault or under the control of a controller, the converters each having a fault current limiting function integrated into the converter;
   one or more DC switches, wherein each DC switch is operative to disconnect at least a portion of a DC bus or a DC branch; and
   a controller circuit configured to
   receive measurements of DC bus currents;
   receive an indication of a fault in the system;
   coordinate, via activation of a current limiting function of the converters, an output of a limited DC current by a plurality of the converters in response to the indication of the fault in the system, the limited DC current being coordinated such that at least one of a current level and a duration of the limited DC current for at least one of the converters during activation of the fault current limiting function is different than the current level and/or duration of the limited DC current of at least another one of the converters;
   identify a location for the indicated fault, based on the measurements of DC bus currents, wherein said identifying at least partly depends on the converter current being at or about its corresponding predetermined, limited, DC current level for at least one of the DC converters; and
   open one or more of the DC switches, based on the identified location of the indicated fault; and
   coordinate, after the one or more DC switches have been opened, the deactivation of the current limiting function of the converters by some, but not all, of the plurality of the converters.

19. The DC electric power distribution system of claim 18, wherein the limited DC current is at or around a current level.

20. The DC electric power distribution system of claim 18, wherein the controller circuit is configured to identify the location for the indicated fault based further on measurements on the DC buses of one or more of:
   current levels;
   current derivatives;
   voltages; and
   current directionalities.

21. The DC electric power distribution system of claim 18, wherein the controller circuit is configured to open all tie line and branch DC switches connected to a first DC bus in response to identifying the first DC bus as the location of the indicated fault.

22. The DC electric power distribution system of claim 18, wherein the controller circuit is configured to open a DC switch immediately upstream or DC switches on both sides of an identified fault location in response to identifying a DC branch as the location of the indicated fault.

23. The DC electric power distribution system of claim 18, wherein the controller circuit is further configured to reconfigure at least a portion of the system, after opening one or more of the DC switches, by activating one or more alternative paths for connecting equipment affected by said opening of one or more of the DC switches.

24. The DC electric power distribution system of claim 18, wherein the controller circuit is further configured to:
   determine that the fault has been isolated, after opening one or more of the DC switches;
   determine, after the fault has been determined to be isolated, a voltage recovery in a portion of the system, and
   wherein the deactivation of the outputting of the limited DC current occurs after said determining of the voltage recovery.

25. A direct-current (DC) electric power distribution system, comprising:
   multiple DC buses, each either directly or through converters associated with one or more power sources and one or more loads, connected by branches and converters, wherein the converters each having a fault current limiting function integrated into the converter, at least one of the converters being an AC/DC converter or DC/DC converter and wherein the current limiting function is configured to limit its DC output current, in response to an indicated fault, to a first current level for a first interval of time for at least one of the converters while the DC output current from another one of the converts is limited to a second current level for a second duration of time, the second current level being different than the first current level, and/or the second duration of time being different than the first duration of time; and
   one or more protection devices, each of which is configured to open in response to a device current exceeding at least one respective threshold for a respective period of time, wherein each of the thresholds is based on at least one of the first current levels and second current levels.

26. The DC electric power distribution system of claim 25, wherein the system comprises a first converter and first and second protection devices, wherein the second protection device is downstream from the first protection device, with respect to the first converter, and wherein the first and second protection devices are configured so that the second protection device opens before the first protection device, for a given fault current level.

* * * * *